E. Y. MALONE.
AUTOMOBILE TIRE.
APPLICATION FILED JAN. 5, 1920.
1,354,411.                                   Patented Sept. 28, 1920.
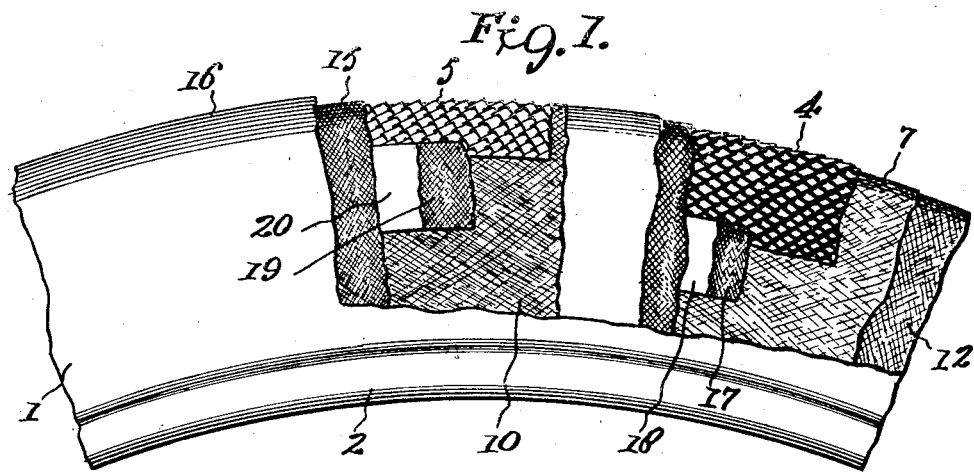
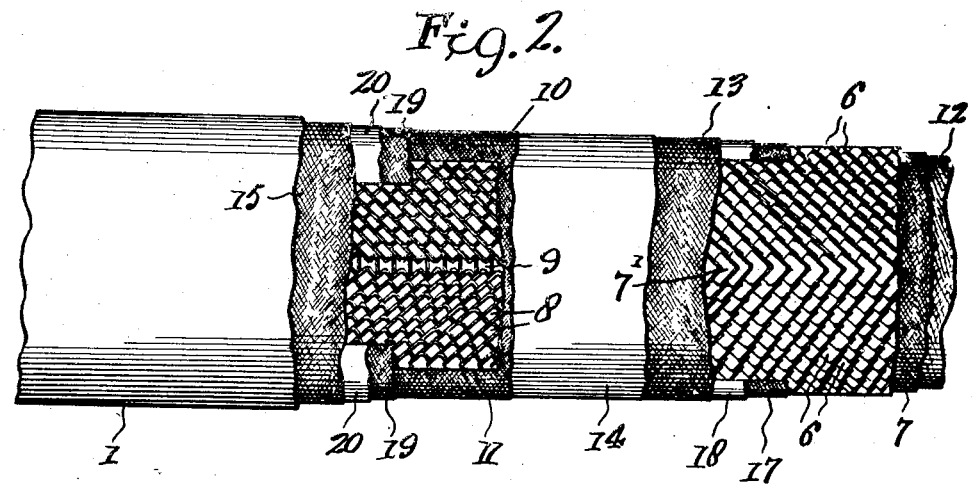
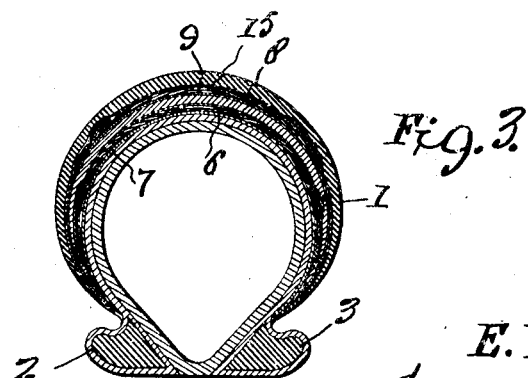
Inventor.
E. Y. Malone.
by Wilkinson & Giusta.
Attorneys.

UNITED STATES PATENT OFFICE.

EUGENE Y. MALONE, OF MOBILE, ALABAMA.

AUTOMOBILE-TIRE.

1,354,411.  Specification of Letters Patent.  Patented Sept. 28, 1920.

Application filed January 5, 1920. Serial No. 349,417.

*To all whom it may concern:*

Be it known that I, EUGENE Y. MALONE, a citizen of the United States, residing at Mobile, in the county of Mobile and State of Alabama, have invented certain new and useful Improvements in Automobile-Tires; and I do hereby declare the following to be a full, clear, and exact description of the invention, such as will enable others skilled in the art to which it appertains to make and use the same.

The present invention relates to improvements in automobile tires, and consists more particularly in an improved casing or outer shoe provided with improved armor incorporated in the body of the casing or shoe for the purpose of preventing obstacles from penetrating the same and puncturing the inner tube.

An object of the present invention is to provide an improved armored casing or shoe which will be substantially impenetrable to sharp objects, such as nails, and which will contribute to the wearing qualities and life of the tire, and which will not materially increase the cost of manufacture over the present cost of manufacturing standard tires.

In the accompanying drawings forming a part of this application, and in which similar reference symbols indicate corresponding parts in the several views:

Figure 1 is a fragmentary side elevational view of a casing or shoe, with parts broken away, and showing a construction according to the present invention.

Fig. 2 is a top plan view of the same; and

Fig. 3 is a cross sectional view of a tire constructed in accordance with my invention.

Referring more particularly to the drawings, wherein only a single embodiment of the invention is illustrated, 1 designates generally the casing or shoe of a pneumatic automobile tire made of the general form now extensively in use. This tire 1 is provided with the usual beads 2 and 3, as shown in Fig. 3, for the purpose of engaging the rim of the wheel.

In accordance with the present invention the casing or shoe 1 is constructed with two sheets of armor 4 and 5 formed in a peculiar manner and spaced apart in the body of the casing. The inner sheet 4 is formed of numerous small plates of metal 6, made to overlap each other after the fashion of fish scales and attached to a backing 7 of canvas or the like material. The metal pieces or plates 6 of the inner armor sheet 4 are assembled by first securing the marginal or edge plates 6 to the backing 7 and thereafter placing subsequent rows in overlapping relation, the rows being arranged diagonally across the tire.

As shown in Fig. 2, the metal plates 6 preferably progress in size from minute plates along the outer edge to comparatively large plates 7' forming the center and passing circumferentially about the tire midway of the tread portion. The transverse rows of the metal plates 6, as above explained, are arranged diagonally, but the diagonal direction of the rows of plates 6 at one side of the central enlarged plates 7' is preferably reversed on the other side, as clearly shown in Fig. 2.

The overlapping small plates 6 form a substantially impenetrable armor and at the same time allow the flexing of the tire which is necessary to resiliency. The central circumferential row of enlarged plates 7' is preferably made to overlap the next smaller plates of adjacent rows, and the armor sheet 4 is extended to a considerable distance about the sides of the casing. Each of the metal plates 6 is preferably rounded off slightly at the corners and on the edges so as to facilitate free movement on each other and to prevent possible cutting of the adjacent fabric and rubber.

The outer armor sheet 5 is composed of metal pieces or plates 8 similar to the plates 6 of the inner layer 4, but they are assembled in inverse order as compared with the plates 6, or, in other words, the central enlarged metal plates 9 of the outer sheet being first secured to the backing 10 and subsequent circumferential rows are placed in overlapping relation from the center toward the outer sides of the tire. The size of the metal plates 8 also diminishes progressively from the center outwardly on both sides, and the metal plates are similarly formed with rounded corners or edges and are also assembled in transverse rows extending diagonally in opposite directions at opposite sides of the center plates 9, the rows forming substantially right angles at the center plates.

The metal plates may be vulcanized between layers of rubber or may be otherwise incorporated in the tire, and they are also preferably galvanized or otherwise treated to prevent rust. It will also be noted that the outermost plates 6 and 8 of the two sheets are cut off in straight circumferential lines, as indicated at 11, thereby forming an even line around the circumference of the casing. This avoids possible cutting of the tire by the projecting edges and it also makes a more uniform structure.

At 12 is designated the inner body portion of the tire which carries the beads 2 and 3, and 13 designates a canvas strip vulcanized over the inner layer 4. At 14 is indicated a sheet of rubber vulcanized between the inner and outer layers 4 and 5, and on the exterior of which is placed the backing 10. Over the outer layer 5 is also placed canvas 15 which is vulcanized with the adjacent portions of the tire. At 16 is represented the outer rubber portion of the tire.

The backing 7 also preferably has secured thereto strips of canvas 17 and strips of rubber 18 secured over the canvas 17, these rubber and canvas strips being made to overlap the outer edges of the metal plates 4 in order to protect the plates and adjacent portions of the tire.

Similar canvas strips 19 and rubber strips 20 are secured to the backing 10 and overlap the edges of the metal plates 8 of the outer layer for a similar purpose.

It will be appreciated that a tire built up in the manner above described will afford a double armor, the metal plates 8 of the outer sheet 5 being inclined in one direction, while the plates 6 of the inner layer 4 are inclined in the opposite direction, so that an obstacle, such as a nail, would necessarily be bent in two directions before penetrating to the inner tube.

It is obvious that those skilled in the art may vary the details of construction and arrangements of parts without departing from the spirit of my invention, and therefore I do not wish to be limited to such features except as may be required by the claim.

I claim:

A tire of the character described including an inner portion having beads, a backing secured over the inner portion, an armor sheet on said backing including numerous small metal plates of substantially rectangular form having rounded edges, secured to the backing in overlapped relation, the plates being smaller at the circumferential edges of the sheet and increasing in size toward the center, the enlarged center plates being made to overlap the plates of adjacent rows on both sides thereof, the transverse rows of the plates being arranged in two diagonal directions across the tire and meeting at substantially right angles at the central enlarged plates, a layer of canvas vulcanized over the inner sheet, a layer of vulcanized rubber placed over said canvas layer, a second backing secured over said rubber layer, an outer metal armor sheet secured to said backing and made up of numerous small metal plates, said sheet being narrower than the inner sheet and the plates being overlapped in opposite directions as compared with the first sheet, a layer of canvas vulcanized over the outer sheet, a rubber tread secured over said last mentioned canvas layer, and canvas and rubber strips secured to the backings and overlapping the edges of the sheets, the edges of the sheets being trimmed off in straight lines, substantially as described.

EUGENE Y. MALONE.